United States Patent
Bryan

(10) Patent No.: US 8,591,166 B2
(45) Date of Patent: Nov. 26, 2013

(54) AXIAL COMPRESSOR VANE

(75) Inventor: William Barry Bryan, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 808 days.

(21) Appl. No.: 12/641,127

(22) Filed: Dec. 17, 2009

(65) Prior Publication Data

US 2011/0027065 A1 Feb. 3, 2011

Related U.S. Application Data

(60) Provisional application No. 61/203,971, filed on Dec. 31, 2008.

(51) Int. Cl.
*F01D 17/00* (2006.01)

(52) U.S. Cl.
USPC ............................................. 415/1; 415/117

(58) Field of Classification Search
USPC ............... 415/144, 914, 115, 117; 416/90 R, 416/231 B, 1, 231 R
See application file for complete search history.

(56) References Cited

U.S. PATENT DOCUMENTS

| | | | | |
|---|---|---|---|---|
| 3,572,960 | A | * | 3/1971 | McBride ....................... 415/115 |
| 3,628,880 | A | * | 12/1971 | Smuland et al. ............... 415/175 |
| 3,992,880 | A | * | 11/1976 | McCutcheon .................. 60/327 |
| 4,228,753 | A | | 10/1980 | Davis et al. |
| 4,287,715 | A | * | 9/1981 | Klees ............................... 60/204 |
| 4,315,714 | A | * | 2/1982 | Exley et al. .................... 415/207 |
| 4,515,523 | A | | 5/1985 | North et al. |
| 5,141,391 | A | | 8/1992 | Acton et al. |
| 5,375,972 | A | | 12/1994 | Gray |
| 6,004,095 | A | | 12/1999 | Waitz et al. |
| 6,055,805 | A | * | 5/2000 | El-Aini et al. ............... 60/226.1 |
| 6,179,565 | B1 | | 1/2001 | Palumbo et al. |
| 6,206,638 | B1 | * | 3/2001 | Glynn et al. ................. 416/97 R |
| 6,254,333 | B1 | | 7/2001 | Merry |
| 6,334,753 | B1 | | 1/2002 | Tillman et al. |
| 6,409,469 | B1 | | 6/2002 | Tse |
| 6,435,814 | B1 | | 8/2002 | Yu et al. |
| 7,018,172 | B2 | | 3/2006 | Prasad et al. |
| 7,033,135 | B2 | | 4/2006 | Mortzheim et al. |
| 2006/0073017 | A1 | | 4/2006 | Manning et al. |
| 2007/0095971 | A1 | | 5/2007 | Yoeli |

* cited by examiner

*Primary Examiner* — Edward Look
*Assistant Examiner* — Liam McDowell
(74) *Attorney, Agent, or Firm* — Krieg DeVault LLP

(57) ABSTRACT

A gas turbine engine axial compressor vane is disclosed having an aperture capable of flowing a relatively high pressure working fluid to change a direction of a flow vector downstream of the vane. The relatively high pressure working fluid can originate from a compressor discharge. The vane may have any number of apertures.

23 Claims, 4 Drawing Sheets

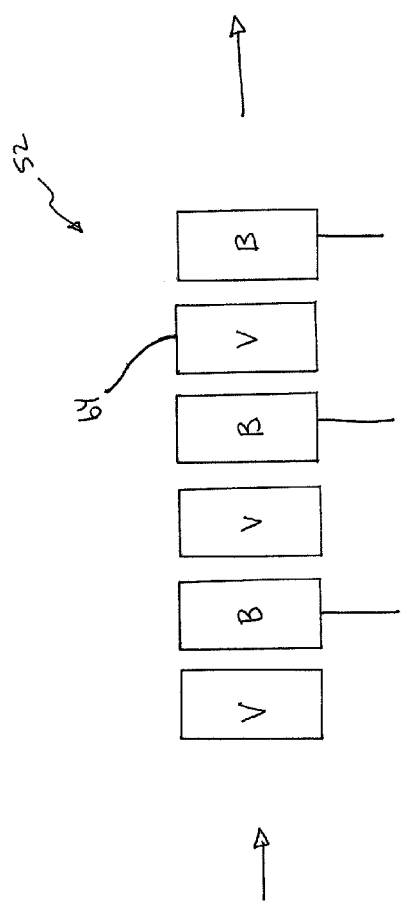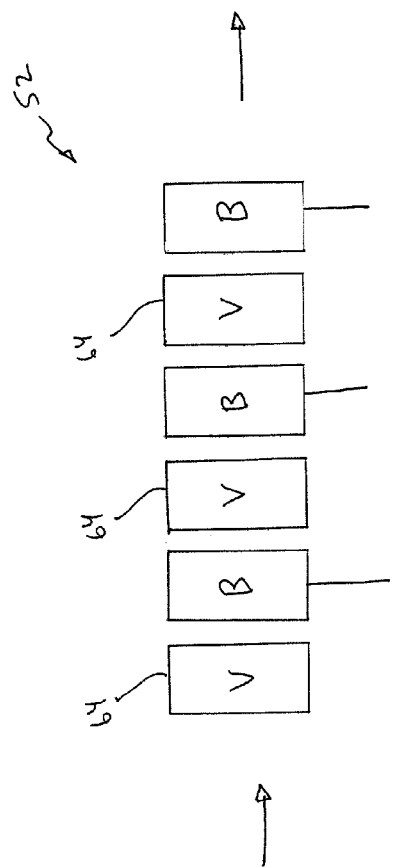

AXIAL COMPRESSOR VANE

CROSS REFERENCE TO RELATED APPLICATIONS

The present application claims the benefit of U.S. Provisional Patent Application 61/203,971, filed Dec. 31, 2008, and is incorporated herein by reference.

GOVERNMENT RIGHTS

The present application was made with the United States government support under Contract No. N00014-04-D-0068 awarded by the United States Navy. The United States government has certain rights in the present application.

FIELD OF THE INVENTION

The present invention generally relates to axial compressor vanes in gas turbine engines, and more particularly, but not exclusively, to flow control in axial compressors using blowing from axial compressor vanes.

BACKGROUND

Achieving adequate operation of axial flow gas turbine engines over a range of corrected flow speeds remains an area of interest. Some existing systems have various shortcomings relative to certain applications. Accordingly, there remains a need for further contributions in this area of technology.

SUMMARY

One embodiment of the present invention is a unique axial flow compressor vane. Other embodiments include apparatuses, systems, devices, hardware, methods, and combinations for altering a flow direction and magnitude downstream of an axial flow compressor vane. Further embodiments, forms, features, aspects, benefits, and advantages of the present application shall become apparent from the description and figures provided herewith.

BRIEF DESCRIPTION OF THE FIGURES

FIG. 4 depicts an embodiment of a multi-stage axial compressor.

FIG. 5 depicts another embodiment of a multi-stage axial compressor.

DETAILED DESCRIPTION OF REPRESENTATIVE EMBODIMENTS

Figure 1:
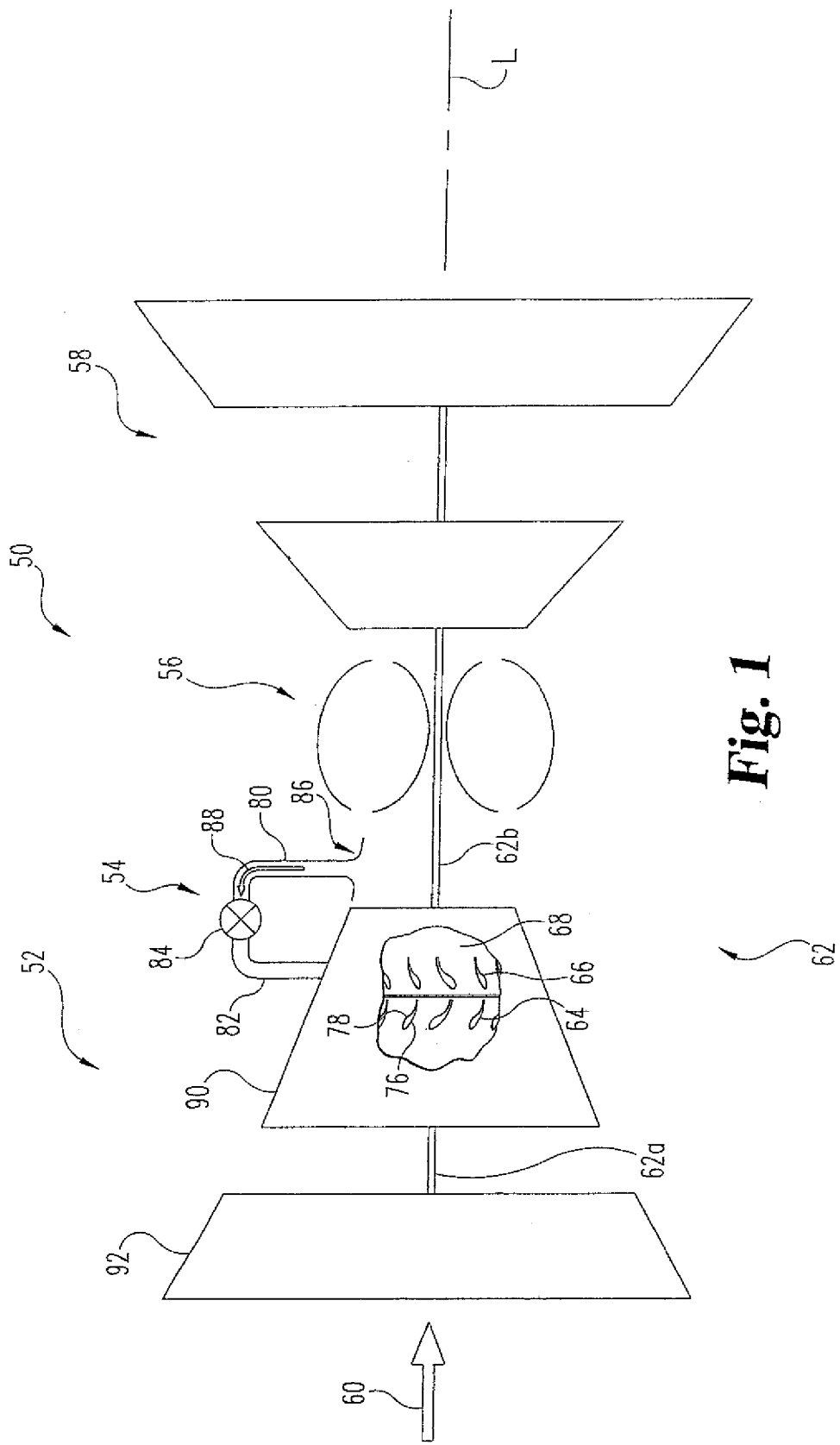
FIG. 1 depicts a schematic of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a schematic of a gas turbine engine 50 is shown having a compressor 52, a compressed working fluid subsystem 54, a combustor 56, and a turbine 58, which together may be used as an aircraft power plant. As used herein, the term "aircraft" includes, but is not limited to, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art.

The gas turbine engine 50 includes a longitudinal axis L extending along a direction of a gaseous flow stream flowing through the gas turbine engine 50. The axis L is an engine centerline axis, but in other embodiments the axis L can be any other reference axis. The gas turbine engine 50 can take any form such as a turbofan, turbojet, turboshaft, or turboprop, to set forth just four non-limiting examples. The gas turbine engine can be an axial flow engine or a mixed axial-centrifugal flow engine.

The gas turbine engine of the illustrative embodiment includes two separate engine spools, but in other embodiments can include fewer or more spools. The spools in the illustrative embodiment are referred to as a high pressure (HP) spool and a low pressure (LP) spool and can be free to rotate at different speeds. The HP spool includes an HP compressor, an HP shaft, and an HP turbine. Likewise, the LP spool includes an LP compressor, an LP shaft, and an LP turbine.

A flow stream 60 of working fluid enters the gas turbine engine 50 and is compressed by the compressor 52 before entering the combustor 56 where it is mixed with fuel and burned before being expanded by the turbine 58. The working fluid can be a gas such as, but not limited to, air. A rotating shafting 62 connects the turbine 58 to the compressor 52 and serves to transfer power between the two. The rotating shafting 62 includes a low pressure shaft 62a and a high pressure shaft 62b. Additional shafting can be included in some embodiments if, for example, the gas turbine engine 50 includes additional spools.

The compressor 52 includes vanes 64 and blades 66 mounted to a rotor 68. The compressor 52 can include multiple rows of vanes 64 and blades 66 that, when paired together, form compressor stages. As used herein, the term "compressor stage" refers to the row of vanes 64 downstream from the row of blades 66. In some embodiments, the compressor 52 may only include a single compressor stage. However, as will be appreciated with the description that follows, if the compressor includes only a single compression stage then an additional stator will be positioned upstream of the blade.

The blades 66 are coupled to the rotor 68 which rotates about axis L. The blades 66 are circumferentially aligned in a row and are arranged to produce a change in pressure and/or velocity of a stream of working fluid traversing the compressor 52 when the blades 66 are rotated. The rotor 68 is connected to a shaft, such as the high pressure shaft 62b, and can be rotated at a variety of rates and corrected speeds.

The vanes 64 are used to influence the flow of working fluid as it traverses a portion of the compressor 52 en route to the blades 66 by flowing a relatively high pressure working fluid through apertures (discussed further below). When flowing the relatively high pressure working fluid, the vanes 64 can cause a change in an incoming flow vector to the blades 66. For example, a flow of the relatively high pressure working fluid can change the incoming flow vector to the blades 66 such as to produce a relatively higher pressure rise from the blades 66 than is possible if the vanes did not flow the relatively high pressure working fluid. Another example includes modulating the direction of the incoming flow vector by increasing or decreasing the flow of the relatively high pressure working fluid from the vanes 64. Yet another non-limiting example is changing the incoming flow vector to the blades 66 to decrease the relative angle of attack of the blades 66. One use of the current application is in an aircraft having a multistage compressor and operating at high Mach number flight conditions, for example above Mach 3.0. Other high Mach number flight conditions are also contemplated whether above or below Mach 3.0.

The vanes 64 can be used in any or all stages of the compressor 52 (one non-limiting embodiment of which is shown in FIG. 4 having a vane 64 disposed in a rear stage of a multi-stage compressor; another non-limiting embodiment of which is shown in FIG. 5 having three rows of vanes V, all of which are in the configuration of vanes 64). The vanes 64 extend along their respective stacking axes and do not rotate like the blades 66 about the axis L. As used herein, the term "stacking axis" refers to an axis along the span of the vanes 64.

The vanes 64 have an internal flow passage capable of receiving a flow stream of pressurized working fluid from the compressed working fluid subsystem 54. The working fluid received by the vanes 64 can be the same or different as the working fluid flowing through the gas turbine engine 50. The vanes 64 have an inlet aperture, or apertures, located near the hub and an outlet aperture, or apertures, for discharging the flow stream of pressurized working fluid. The aperture, or apertures, for discharging the flow stream is/are discussed further hereinbelow.

The vanes 64 are circumferentially aligned in a row and are generally cambered and have a convex side 76 and a concave side 78. Some embodiments of the gas turbine engine 50 may have more than one row of vanes 64. In the presence of a flow of working fluid, the pressure on the convex side 76 of vanes 64 is generally low, and the pressure on the concave side 78 is generally high. For this reason, the convex side 76 and the concave side 78 are customarily referred to as the suction and the pressure sides, respectively, of the vane. A similar convention also applies to rotating blades in which a convex side of a blade is referred to as the suction side and a concave side is referred to as the pressure side.

The compressed working fluid subsystem 54 operates to convey pressurized working fluid to the vanes 64 and includes a first conduit 80, a second conduit 82, and a valve 84. The pressurized working fluid conveyed by the compressed working fluid subsystem 54 can be regulated/metered through the use of the valve 84. The valve 84 can provide for a variable flow rate of pressurized working fluid including zero flow rate, if so desired. Many different types of valves and/or valving arrangements can be used. In some embodiments, a plenum can be disposed between a compressor discharge 86 and the vanes 64. Other variations of the compressed working fluid subsystem 54 are contemplated herein, some of which are described immediately below.

The first conduit 80 and the second conduit 82 are used to convey a relatively high pressure stream 88 of working fluid to the vanes 64. The conduits 80 and 82 can accommodate a variety of fluid flow rates, temperatures, and pressures. The first conduit 80 and the second conduit 82 can be any variety of lengths and cross sectional shapes. Although the conduits 80 and 82 are depicted as singular conduits in the illustrative embodiment, other conduits or passageways can also be used. For example, the conduits 80 and 82 can consist of multiple conduits in a serial arrangement, and/or multiple conduits in a partially parallel arrangement.

The compressed working fluid subsystem 54 can originate at any number of locations and can be supplemented by other devices. In the illustrative embodiment the compressed working fluid subsystem 54 withdraws working fluid from the compressor discharge 86 of an HP compressor 90 and delivers it to a vane within the HP compressor 90, but in some embodiments the working fluid can be routed from the compressor discharge 86 to a stage within an LP compressor 92. Some embodiments of the compressed working fluid subsystem 54 can begin and end within the same compressor section of an individual spool. For example, some embodiments can deliver working fluid from a downstream station of the HP compressor 90 to an upstream station located within the same HP compressor 90. In other embodiments, the compressed working fluid subsystem 54 can deliver working fluid to a vane from an external source of working fluid that may or may not be derived from a flow of working fluid through the compressor 52. In some embodiments, a pump can be disposed between the source of the relatively high pressure stream 88 and the vanes 64 to provide for an additional increase in pressure. Alternatively and/or additionally, the pump can be used to provide the relatively high pressure stream 88 from a location external to the gas turbine engine 50.

Figure 2:
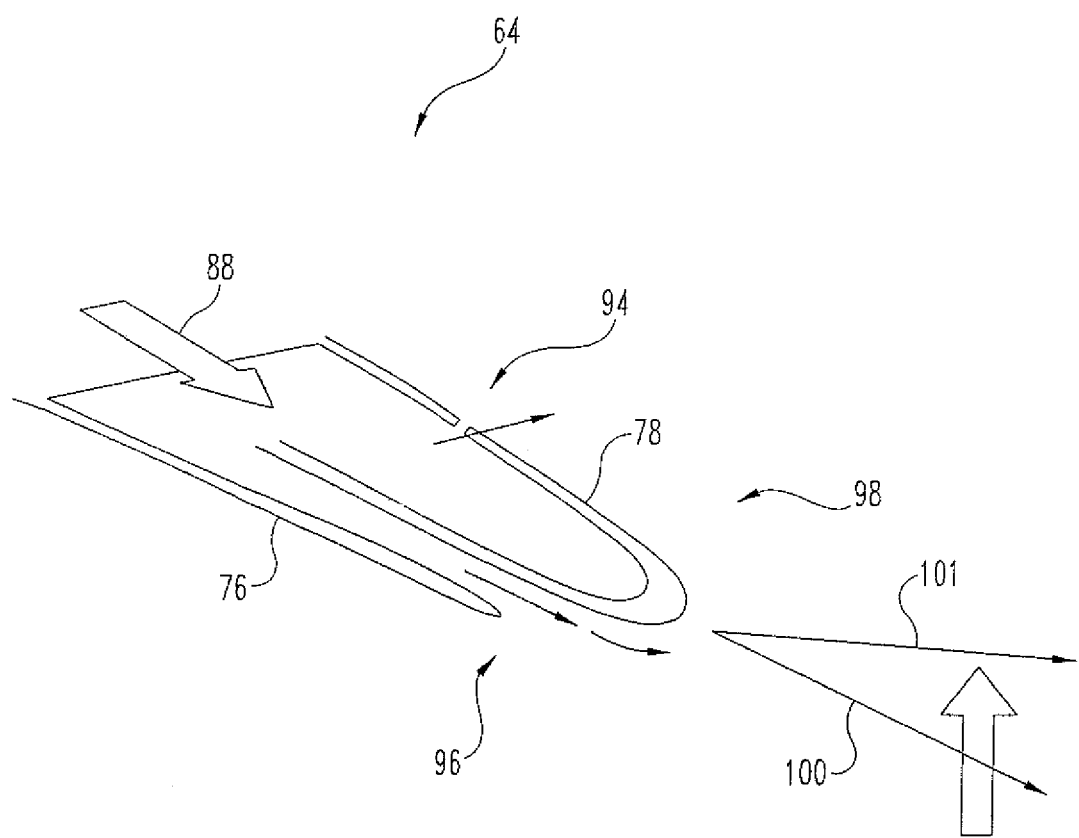
FIG. 2 depicts a view of a trailing edge region of one embodiment of the present application.

With reference to FIG. 2, a partial view of the trailing edge of the vanes 64 from FIG. 1 is shown. The vane 64 is shown having a momentum aperture 94 and a coanda aperture 96 formed near a trailing edge 98 of the vane 64. The momentum aperture 94 and the coanda aperture 96 are used to form part of a flow path so that the relatively high pressure stream 88 can be blown or injected into the moving flow stream between vanes. As used herein, the terms "blown" or "injected" refer to the movement of working fluid from within the vane 64 and through the apertures (discussed below), and is not meant to imply any particular flow rate or direction. When relatively high pressure working fluid is blown or injected through either or both of apertures 94 and 96, the direction of a flow downstream of the vane 64 changes from an unaided direction to an aided direction, as may be seen by the relative orientation of unaided flow vector 100 and aided flow vector 101. Though the embodiment depicted in FIG. 2 includes two apertures, other embodiments of the vane 64 may include only one of the two apertures, either the momentum aperture 94 or the coanda aperture 96. Of the vanes 64 in a single vane row, some may have a mixture of the two apertures while others may have only one type.

The apertures 94 and 96 extend along the stacking axis of the vane 64 from the hub to the tip and are located at a downstream chord location near the trailing edge 98 of the vane 64. As used herein, the term "hub" refers to the side of the vane 64 closest to the rotor while the term "tip" refers to the side of the vane 64 furthest from the rotor. Though the vane 64 is only shown in a cross sectional view, the apertures 94 and 96 may either extend along the entire span of the vane 64 or may extend only partially along the span. In some embodiments, multiple apertures may be distributed at various portions along the stacking axis. For example, the first aperture may be located along the first ⅓ of the span of the vane 64 as measured from the hub, and the second aperture may be located along the last third of the vane 64, to set forth just one non-limiting example. In some embodiments, not all vanes 64 that are located in the same row need have the same geometry, numbers, or arrangement of apertures 94 and 96. Furthermore, not all apertures 94 and 96 formed in a single vane 64 flow the relatively high pressure stream 88 at the same flow rate, temperature, and/or pressure. For example, the apertures 94 and 96 located near the hub may flow the relatively high pressure stream 88 at a lower rate than the apertures located near the tip, to set forth just one non-limiting example.

Figure 3:
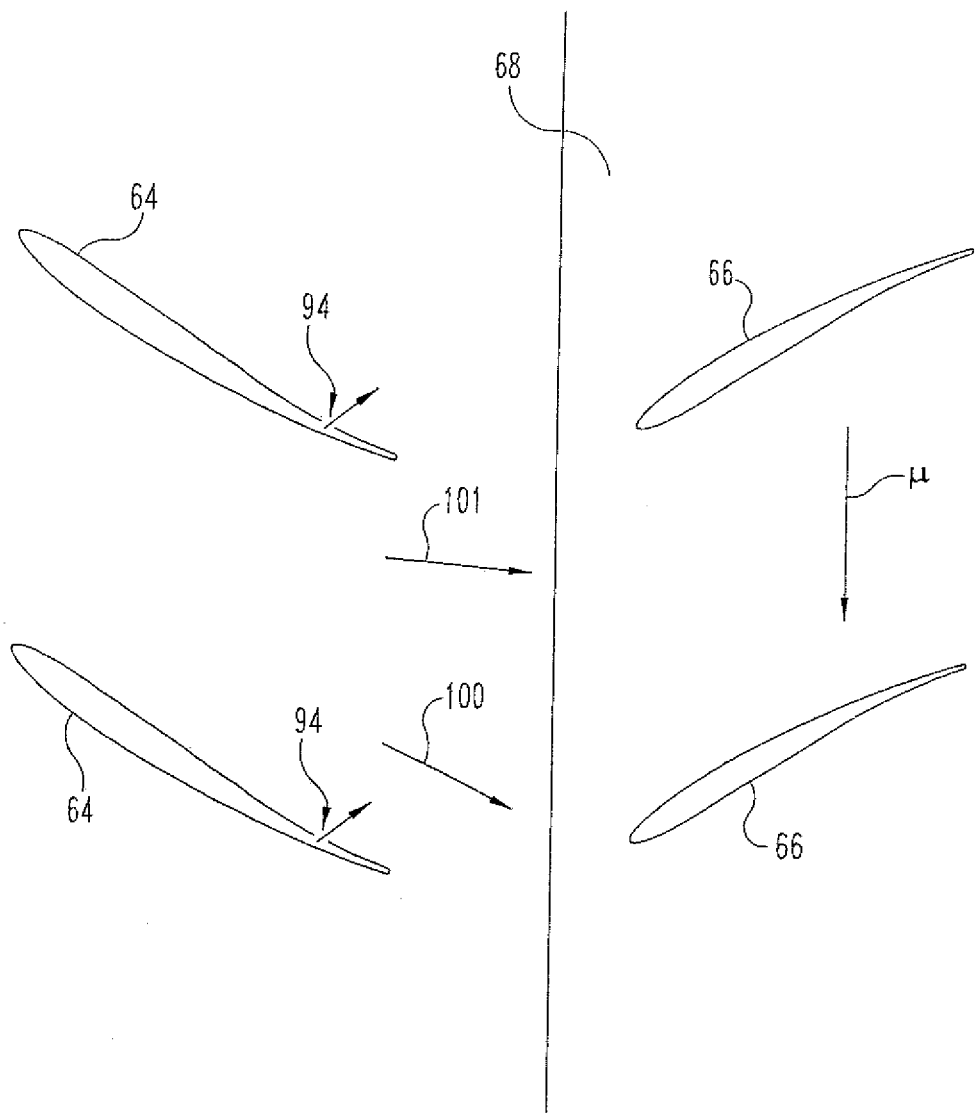
FIG. 3 depicts a pair of vanes and blades of one embodiment of the present application.

With reference to FIG. 3, a view of two pairs of vanes 64 and blades 66 from FIG. 1 are shown. Though the embodiment of FIG. 3 depicts the single momentum aperture 94, other types and configurations of apertures may also be used. The description that follows, therefore, is representative of other types of apertures useful for blowing or injecting pressurized working fluid, with possible differences occurring in magnitudes and directions of the various flow vectors presented.

The working fluid flowing through the compressor 52 (shown in FIG. 1) approaches the vanes 64 from an upstream position within the gas turbine engine 50 (shown in FIG. 1). A row of blades 66 are positioned downstream of the vanes 64 and are rotated as shown by the vector U. Before the relatively high pressure stream 88 (shown in FIGS. 1 and 2) is blown or injected from the momentum apertures 94, the flow vector downstream of the vanes 64 has a direction and magnitude denoted by reference numeral 100. After the relatively high pressure stream 88 (shown in FIGS. 1 and 2) is blown or injected from the momentum apertures 94, the flow vector downstream of the vanes 64 has a direction and magnitude denoted by reference numeral 101. The addition of relatively high pressure working fluid through the apertures 94 and 96 causes a change in magnitude and/or angle of the flow stream downstream of the vane 64, thereby changing the orientation of the flow stream from an unaided vector to an aided vector. Varying the flow rate of relatively high pressure stream 88 alters the influence on an aided flow vector 101, such that some flow rates may cause the aided flow vector 101 to be altered in direction or magnitude relative to the unaided flow vector 100.

One aspect of the present application includes an axial flow compressor vane for a gas turbine engine having at least one vane aperture for blowing working fluid. The vane aperture is in fluid communication with a compressor discharge of the gas turbine engine, such that relatively high pressure working fluid is conveyed from the compressor discharge and thereafter flows from the vane aperture. The vane aperture may be operated in a blowing state by flowing pressurized working fluid, or in a non-blowing state. A flow vector of the working fluid downstream of the vane is altered in either magnitude or direction, or both, from a non-blowing state to a blowing state when pressurized gas from the compressor discharge is flowed through the vane aperture.

Another aspect of the present application provides an apparatus comprising a gas turbine engine axial compressor vane having an internal passageway in fluid communication with a vane aperture located at a downstream chord location of the vane and operable to eject a flow of pressurized gas, a gas turbine engine axial compressor blade disposed downstream of the vane and operable to turn at a rotational speed during operation of a gas turbine engine, the blade having a first loading at the rotational speed when the flow of pressurized gas is not ejected from the vane, and wherein the vane can flow the pressurized gas through the vane aperture at a flow rate and in an orientation that alters a direction of a flow of working fluid downstream of the vane and increases loading on the blade to a second loading when rotating at the rotational speed.

Still another aspect of the present application provides an apparatus comprising a compressor section of an axial flow gas turbine engine operable to compress a working fluid flowing through the compressor section, the compressor section having a row of vanes upstream from a row of blades, the row of vanes operable to discharge a gas to alter a direction of the flow of working fluid in a region between the row of vanes and the row of blades, wherein the gas is discharged from within at least some of the vanes and increases a pressure rise across the row of blades.

Yet another aspect of the present application provides an apparatus comprising a gas turbine engine having an axial flow compressor, a compressor bladed rotor disposed within the axial flow compressor, and a row of compressor vanes located upstream from the compressor bladed rotor, the row of compressor vanes having flow control means for altering a flow vector upstream of the compressor bladed rotor.

Still another aspect of the present application provides a method of loading a downstream rotor in a gas turbine engine comprising flowing a relatively pressurized working fluid through a passageway internal to a compressor vane and blowing the relatively pressurized working fluid through an aperture, rotating an axial compressor blade about an axis of a gas turbine engine, and generating a higher pressure rise from the rotating axial compressor blade when the relatively pressurized working fluid is blown from the aperture than when the relatively pressurized working fluid is not blown from the aperture.

A further aspect of the present application provides an apparatus comprising a gas turbine engine axial compressor vane having an internal conduit in fluid communication with a vane aperture located at a downstream chord location of the vane and operable to eject a flow of relatively pressurized gas at a flow rate and in an orientation that alters a direction of a flow of working fluid downstream of the vane.

Still a further aspect of the present application provides an apparatus comprising a compressor section of an axial flow gas turbine engine operable to compress a working fluid flowing through the compressor section, the compressor section having a row of vanes upstream from a row of blades, the row of vanes operable to convey a relatively pressurized gas, wherein the relatively pressurized gas is operable to alter a direction of the flow of working fluid in a region between the row of vanes and the row of blades.

Still another aspect of the present application provides a method of loading a downstream rotor in a gas turbine engine comprising flowing a pressurized working fluid through a conduit internal to a compressor vane, rotating an axial compressor blade about an axis of a gas turbine engine, modulatingly blowing a pressurized working fluid from an aperture of the compressor vane, and generating a higher pressure rise from the rotating axial compressor blade when the pressurized working fluid is blown from the aperture than when the pressurized working fluid is not blown from the aperture.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine axial compressor vane having an internal passageway in fluid communication with a vane aperture located at a downstream chord location of the vane and operable to eject a flow of pressurized gas;
a gas turbine engine axial compressor blade disposed downstream of the vane and operable to turn at a rotational speed during operation of a gas turbine engine, the blade having a first loading at the rotational speed when the flow of pressurized gas is not ejected from the vane; and
wherein the vane flows the pressurized gas through the vane aperture at a flow rate and in an orientation that alters an angular direction of a flow of working fluid downstream of the vane and changes the first loading on the blade to a second loading when rotating at the rotational speed.

2. The apparatus of claim 1 wherein the second loading is a relatively higher loading than the first loading.

3. The apparatus of claim 1 which further includes a plurality of apertures distributed along a span of the gas turbine engine axial compressor vane.

4. The apparatus of claim 3 wherein the vane aperture is located on a pressure surface of the vane and is operable to eject the flow of pressurized gas in a direction having a vector component normal to the pressure surface, and wherein a momentum flow is produced when the pressurized gas flows from the vane aperture.

5. The apparatus of claim 3 wherein the vane aperture is located on a suction surface of the vane and is operable to eject the flow of pressurized gas in a direction tangential to the suction surface, and wherein a coanda effect flow is produced when the pressurized gas flows from the vane aperture.

6. The apparatus of claim 1 wherein the vane and blade form part of a multi-stage axial compressor, the vane immediately upstream of the blade and located in a rear stage of the multi-stage axial compressor.

7. The apparatus of claim 6 wherein the blade is in a last row of blades before a compressor discharge.

8. The apparatus of claim 6 which further includes a source of the pressurized gas, wherein the source is a compressor discharge of the gas turbine engine.

9. The apparatus of claim 8 which further includes a regulator configured to vary the flow rate of the pressurized gas.

10. An apparatus comprising:
a compressor section of an axial flow gas turbine engine operable to compress a working fluid flowing through the compressor section, the compressor section having a row of vanes upstream from a row of blades, the row of vanes operable to discharge a gas to alter a direction of the flow of working fluid in a region between the row of vanes and the row of blades such that a swirl angle of incoming air to the row of blades is changed relative to an angle that would be present if gas were not discharged from the row of vanes, wherein the gas is discharged from within at least some of the vanes and changes a pressure difference across the row of blades.

11. The apparatus of claim 10 which further includes multiple exit apertures operable to convey the gas.

12. The apparatus of claim 11 wherein the gas is withdrawn from a compressor discharge flow of the axial flow gas turbine engine.

13. The apparatus of claim 10 wherein the compressor section includes multiple compressor stages having at least two rows of vanes operable to convey a relatively pressurized gas.

14. The apparatus of claim 10 wherein the row of vanes is not variable and the change in pressure is a relative increase in pressure across the row of blades.

15. An apparatus comprising:
a gas turbine engine having an axial flow compressor;
a compressor bladed rotor disposed within the axial flow compressor; and
a row of compressor vanes located upstream from the compressor bladed rotor, the row of compressor vanes having flow control means for altering a flow vector angle upstream of the compressor bladed rotor.

16. The apparatus of claim 15 which further includes a compressor discharge operable to provide a relatively pressurized working fluid to the means for altering a flow vector.

17. The apparatus of claim 16 which further includes a means for regulating a flow rate of a relatively high pressure working fluid.

18. A method of loading a downstream rotor in a gas turbine engine comprising:
flowing a relatively pressurized working fluid through a passageway internal to a compressor vane and blowing the relatively pressurized working fluid through an aperture;
rotating an axial compressor blade about an axis of a gas turbine engine, wherein a flow having a speed and angular direction exists between the compressor vane and the compressor blade during operation;
moving the angular direction of the flow between the compressor vane and axial compressor blade as a result of the flowing; and
generating a difference in pressure from the rotating axial compressor blade when the relatively pressurized working fluid is blown from the aperture than when the relatively pressurized working fluid is not blown from the aperture.

19. The method of claim 18 which further includes creating a coanda effect flow on a suction side of the vane.

20. The method of claim 18 which further includes creating a momentum flow effect on a pressure side of the vane.

21. The method of claim 18 which further includes operating an axial flow compressor of a gas turbine engine at speeds above Mach 3.

22. The method of claim 18 which further includes modulatingly blowing the pressurized working fluid from the aperture of the compressor vane.

23. The method of claim 18 wherein the generating includes producing a relatively higher pressure rise from the rotating axial compressor blade when the relatively pressurized working fluid is blown from the aperture than when the relatively pressurized working fluid is not blown from the aperture.

* * * * *